(12) United States Patent
O'Rourke

(10) Patent No.: US 6,416,097 B1
(45) Date of Patent: Jul. 9, 2002

(54) VIBRATING SAND SIFTING TOY

(76) Inventor: Anthony L. O'Rourke, 23852 Pacific Coast Hwy., #201, Malibu, CA (US) 90265

(*) Notice: Subject to any disclaimer, the term of this patent is extended or adjusted under 35 U.S.C. 154(b) by 0 days.

(21) Appl. No.: 09/489,858

(22) Filed: Jan. 24, 2000

Related U.S. Application Data

(63) Continuation-in-part of application No. 09/082,411, filed on May 20, 1998, now Pat. No. 6,022,058.
(60) Provisional application No. 60/047,285, filed on May 21, 1997.

(51) Int. Cl.$^7$ .......................... A01B 1/02; A63H 33/32; B07B 1/02
(52) U.S. Cl. .......................... 294/55; 209/418; 294/49; 294/59; 446/70
(58) Field of Search .......................... 294/1.1, 1.3–1.5, 294/7–10, 49, 51, 54.5, 55, 57, 59; 15/257.1, 257.3; 209/235, 332, 417–420; 221/200, 204; 222/161, 196, 196.1, 196.3; 446/70–72, 144, 424; D8/10; D21/472, 532

(56) References Cited

U.S. PATENT DOCUMENTS

| | | | | |
|---|---|---|---|---|
| 902,954 A | * | 11/1908 | Felty | 209/419 |
| 2,525,641 A | * | 10/1950 | Bouska | 222/161 |
| D219,465 S | * | 12/1970 | Fitzgerald | D21/472 |
| 3,976,564 A | * | 8/1976 | Holder | 209/417 X |
| 4,121,779 A | * | 10/1978 | Mills et al. | 209/417 X |
| 4,466,560 A | * | 8/1984 | Boram | 222/196 |
| D347,497 S | * | 5/1994 | VanSkiver | 294/1.3 X |
| D377,246 S | * | 1/1997 | Clenney | 294/1.3 X |
| 5,622,266 A | * | 4/1997 | Curtis | 209/417 X |
| D389,530 S | * | 1/1998 | Herman | D21/472 |
| D398,663 S | * | 9/1998 | Freelander | D21/532 |

FOREIGN PATENT DOCUMENTS

| | | | | |
|---|---|---|---|---|
| AT | 175376 | * | 7/1953 | 294/49 |
| DE | 3517351 | * | 11/1986 | 294/49 |
| FR | 2285163 | * | 4/1976 | 294/49 |

* cited by examiner

Primary Examiner—Johnny D. Cherry
(74) Attorney, Agent, or Firm—Lyon & Lyon LLP

(57) ABSTRACT

A vibrating sand sifting toy that has a selectively activated vibrating mechanism mounted in a portion of the toy for causing oscillatory vibration of a surface portion of the toy. Two embodiments are in the form of a scoop with a handle. The bottom of the scoop portion is provided with openings in a predetermined pattern and size for discharging sand, dirt or other particulate material in a predetermined pattern for the education and entertainment of a child operating the vibrating toy. In one of those two embodiments the scoop portion is removable and replaceable with other scoop portions having different predetermined patterns of openings. In the other of those two embodiments the bottom of the scoop portion has an open frame for removably receiving a template having a predetermined pattern of openings for discharging sand and various templates with different predetermined patterns may be used. A third embodiment is in the form of a bowl-shaped hopper with removable and replaceable templates with the patterns of openings and a vibrator in the body.

5 Claims, 6 Drawing Sheets

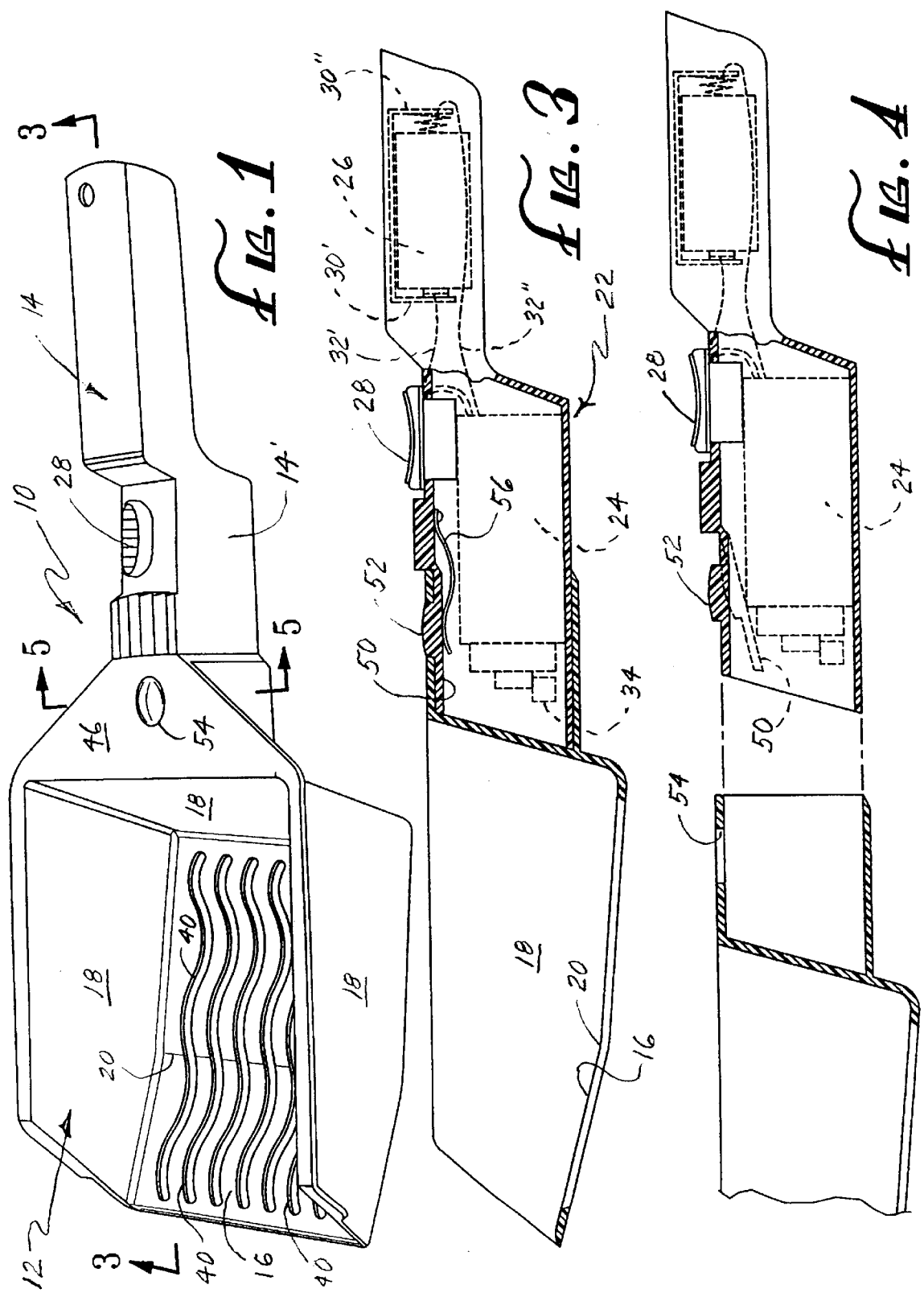

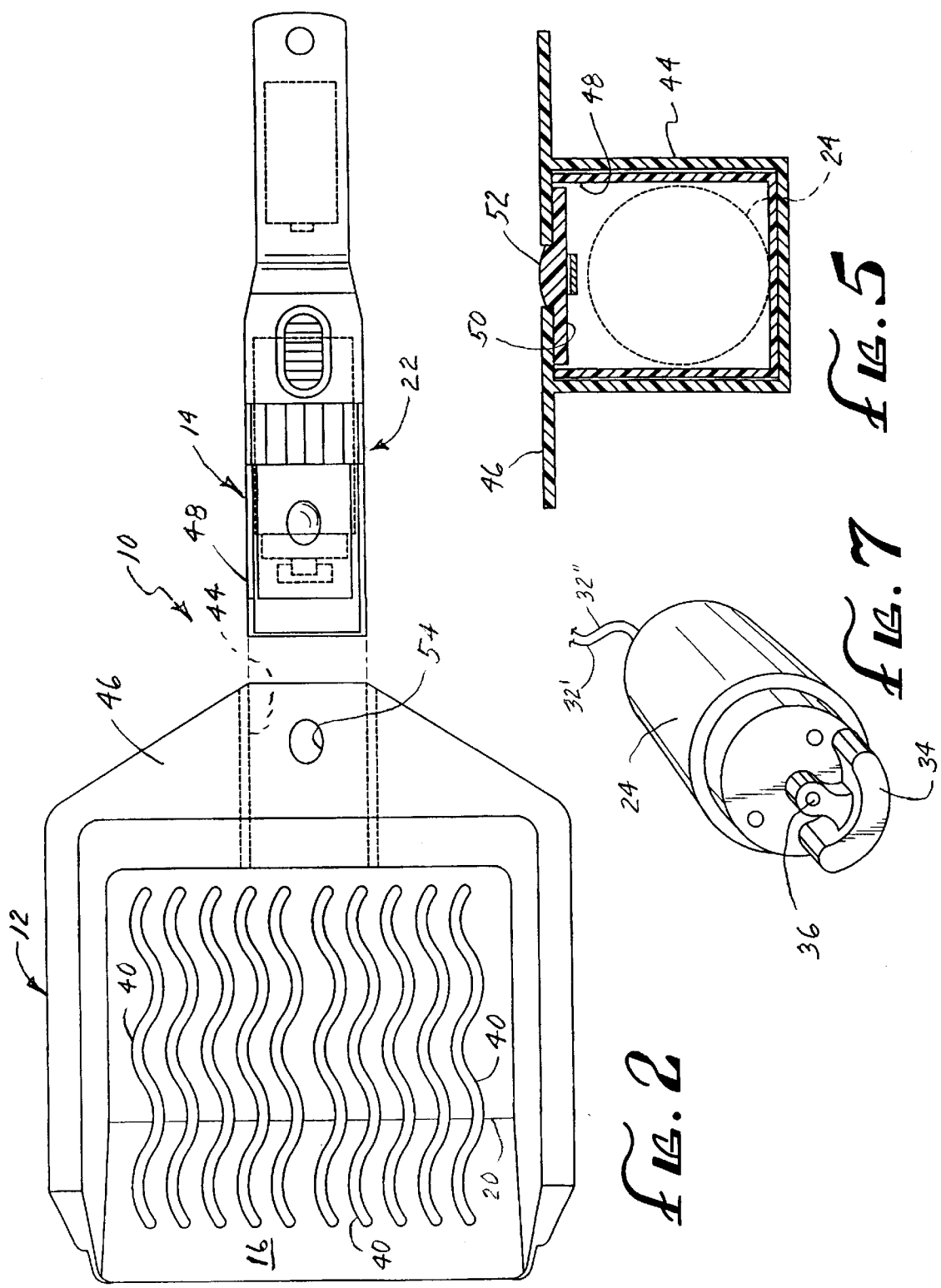

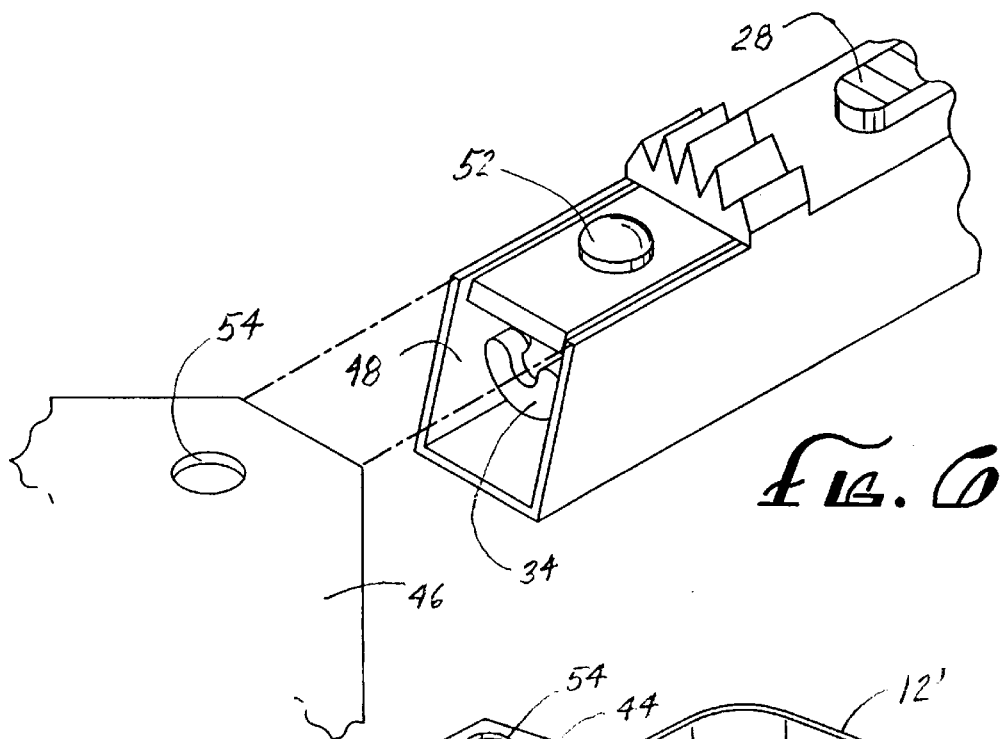
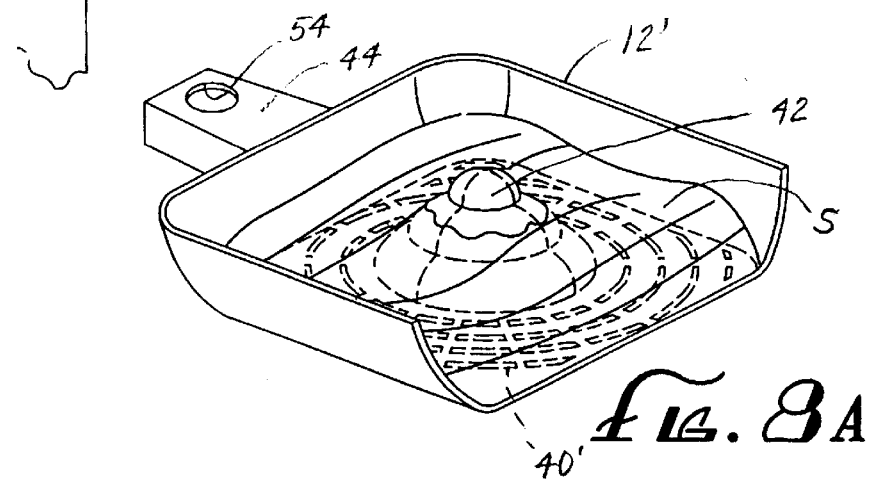
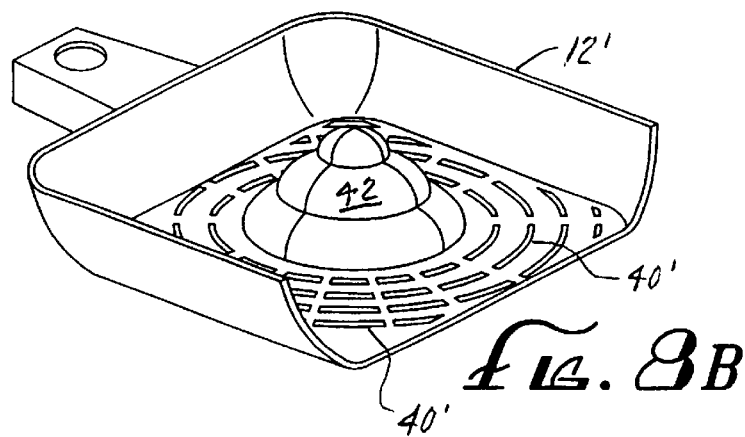

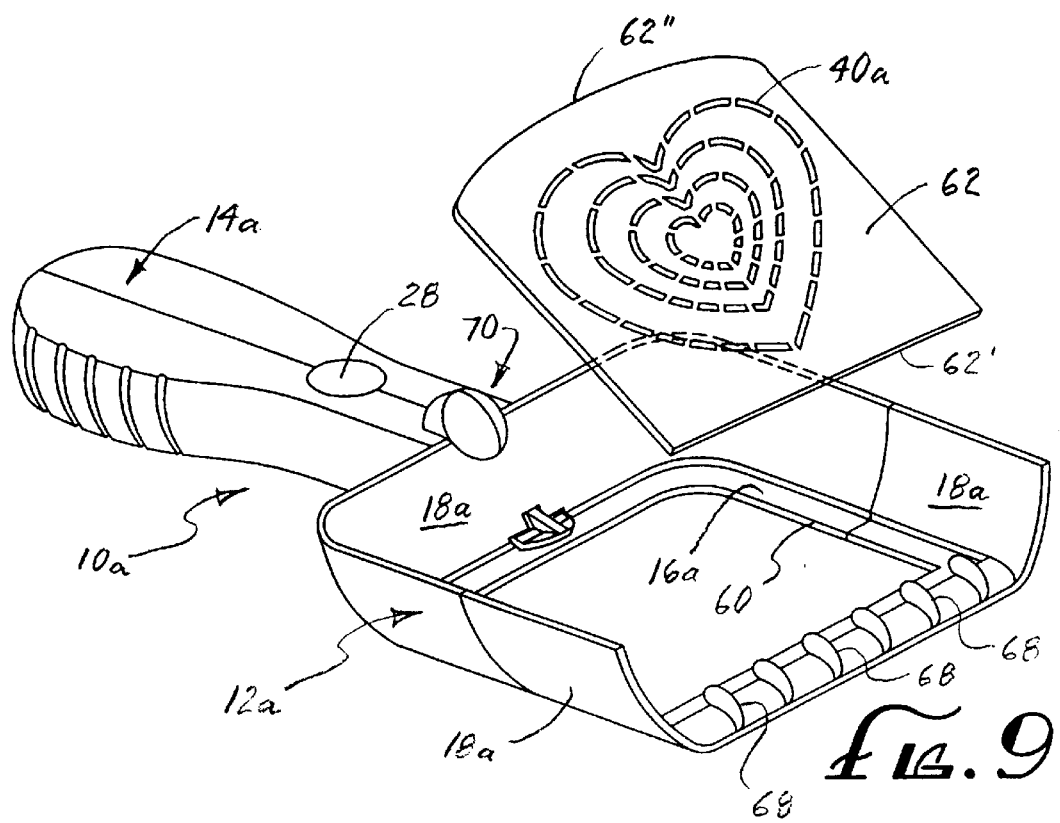
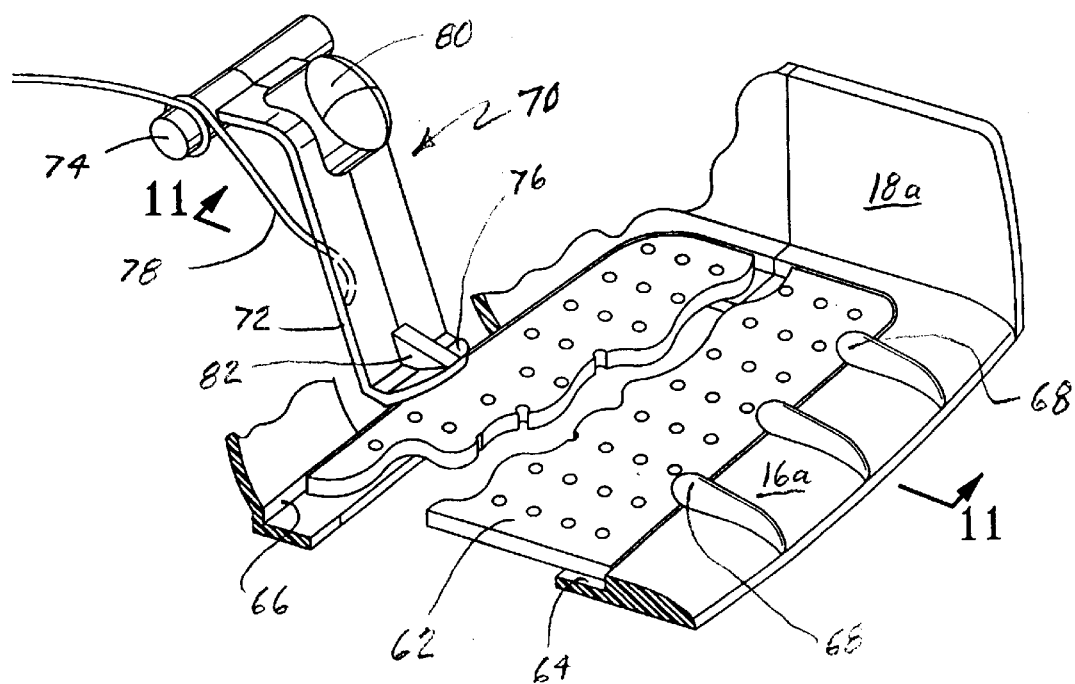

VIBRATING SAND SIFTING TOY

This application is a continuation-in-part of U.S. patent application Ser. No. 09/082,411, filed May 20, 1998, now U.S. Pat. No. 6,022,058 that claims the benefit of U.S. Provisional Patent Application Serial No. 60/047,285, filed May 21, 1997.

The present invention relates to a toy for children to use in a sandbox, on a sandy beach, with a pile of dirt, or with a quantity of particles of any material. It has long been common for children to play in sand or dirt using shovels, scoops, spoons, or other utensils to dig the sand or dirt and pour the sand or dirt back in a different location or in a pattern or a mound or into a bucket or the like. Further, children often express their creativity by developing imagined roads, structures and patterns in the sand or dirt with the available utensils.

An object of the present invention is to provide a unique toy for children to use while playing in or with sand, dirt or other particulate material (hereinafter collectively and separately referred to as "sand" for convenience) for their entertainment and for stimulating creativity. Specifically, the toy of the present invention comprises a portable device, such as a hand-held scoop or a movable hopper, having a surface with openings of a predetermined pattern and size for passing sand therethrough and a selectively operable vibrator portion for causing vibration of at least that surface of the device to cause the sand to pass through the openings. Still further, it is contemplated by this invention that a variety of different patterns of openings may be provided in the surface by using replaceable scoop portions or replaceable templates in the scoop portion or hopper having the variety of predetermined patterns.

These and other objects and advantages of the present invention will become readily apparent to those skilled in the art from the following description when considered in conjunction with the accompanying drawings, wherein:

FIG. 1 is a perspective view of a first embodiment of the vibrating sand sifting toy of the present invention in the form of a hand-held scoop;

FIG. 2 is a top plan view of the toy FIG. 1 of the present invention with the scoop portion detached from the handle portion;

FIG. 3 is a sectional elevation view of the toy taken substantially on the line 3—3 of FIG. 1;

FIG. 4 is a sectional elevation view similar to FIG. 3 with the scoop portion detached from the handle portion as shown in FIG. 2;

FIG. 5 is a sectional view taken substantially on the line 5—5 in FIG. 1;

FIG. 6 is a fragmentary perspective view illustrating the detachment of the scoop portion from the handle portion of the toy;

FIG. 7 is a perspective view of the vibrator mechanism employed in the present invention;

FIG. 8A is a perspective view of a modified embodiment of the scoop portion of the toy with sand in the scoop portion;

FIG. 8B is a perspective view of the scoop portion of FIG. 8A without sand in the scoop portion;

FIG. 9 is an exploded perspective view of a second embodiment of the present invention in the form of a hand-held scoop and illustrating a removable template to be installed on the scoop portion of the toy;

FIG. 10 is a fragmentary perspective view of the latch mechanism of the second embodiment for releasably retaining the template in the scoop portion of the toy;

Figure 11:
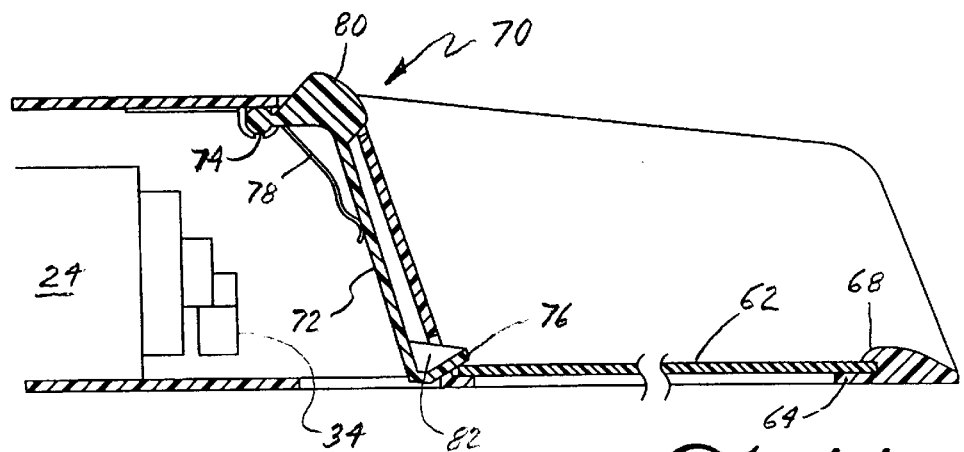
FIG. 11 is a sectional elevation taken along the line 11—11 in FIG. 10 for further illustrating the latch mechanism.

Referring now to FIGS. 1–4 illustrating the first embodiment of the present invention, the vibrating sand scoop toy 10 is preferably formed of a molded plastic and comprises a forward scoop portion 12 and a handle portion 14. The scoop portion 12 is defined by a bottom 16 and side walls 18 which project upwardly from the bottom wall 16. The front of the scoop portion 12 is open with the side walls 18 comprising walls on both lateral sides and at the rear of the scoop portion 12. The bottom wall 16 may be flat or may be slightly inclined upwardly in the forward direction from line 20.

The handle portion 14 of the vibrating sand scoop toy 10 is hollow so as to define a housing for the vibrating mechanism 22. The lower side of the handle is preferably open to allow for insertion of the vibrating mechanism 22 and a cover (not shown) is removably attached to the handle so as to fully encase the vibrating mechanism while defining a lower surface for the handle portion 14 and for gripping the handle portion 14.

The vibrating mechanism 22 includes a DC motor 24, a battery 26, preferably an AA size battery, and a push button on/off switch 28 which projects through the upper surface of the handle and is disposed at the "thumb" position on the handle to facilitate movement between the on and off positions. The vibrating mechanism 22 may be provided with high and low speeds and, if so, the switch 28 is provided with high and low speed settings. The battery 26 is held between contact members 30' and 30" which are in electrical communication with DC motor 24 through wires 32' and 32" and switch 28. An eccentrically mounted weight 34, preferably formed of lead, is mounted on the shaft 36 of the DC motor 24, as shown in FIG. 7. Shaft 36 is substantially coincident with the central axis of the handle portion 14. Motor 24 is rigidly affixed within an enlarged portion 14' of the handle portion 14 and preferably is disposed in contact with the interior walls of the handle portion such that vibration of the motor 24 is transmitted to the handle portion 14 and scoop portion 12 of the vibrating sand scoop toy 10.

Upon moving the switch 28 to the "on" position, DC motor 24 electrically communicates with the battery 26 for causing rotation of the motor shaft 36. The eccentrically mounted weight 34 on shaft 36 causes vibration of the motor 24 and, in turn, the entire scoop toy 10 in the nature of an oscillatory motion about the longitudinal axis of the handle. While the vibrating mechanism 22 has been shown and described as comprising plural separate elements, it is contemplated that the DC motor 24, switch 28, battery 26, contacts 30' and 30" and wires 32' and 32" may be incorporated in a modular unit which could be readily snapped into and out of the handle portion 14 of the toy, which would allow thorough washing of the balance of the toy 10 after removing the modular form of the vibrating mechanism 22.

The bottom wall 16 of the scoop portion 12 is provided with a predetermined pattern and size of openings 40 for causing the discharge of sand therethrough, which discharge is enhanced by the vibrating motion imparted to the scoop portion 12 when the vibrating mechanism 22 is activated. Preferably the openings 40 in the bottom 16 of the scoop portion 12 are of a size and shape to retain most of the sand in the scoop while the vibrating mechanism 22 is deactivated but to allow a controlled discharge of the sand through the openings when the vibrating mechanism 22 is activated. As shown in FIGS. 1 and 2, the openings 40 may be in the form of a plurality of parallel and spaced wavy slots that form a predetermined pattern through which the sand is discharged when the vibrating mechanism 22 is activated to create a pleasant sand discharge pattern.

The scoop portion 12 of the vibrating sand scoop toy 10 in this first embodiment is removable from the handle portion 14 to allow the use of a variety of different scoop portions 12 having different predetermined patterns of holes through which the sand is discharged. For example, FIGS. 8A and 8B illustrate a scoop portion 12' having a predetermined pattern of holes 40' comprised of concentric circles of slots. The scoop portion 12' of FIGS. 8A and 8B also includes a raised portion 42 of a three dimensional design that is partially or completely covered when the scoop 12' is filled with sand. The raised portion 42 is progressively revealed as the sand is discharged through the openings 40' when the vibrating mechanism 22 is activated. As shown in FIG. 8A, only the top portion of the raised portion 42 is visible above the sand S, whereas as in FIG. 8B the entire raised portion 42 is visible when all of the sand has been discharged. In addition to being a three-dimensional design, the raised portion 42 may be colored in different manners to compliment that design and be revealed progressively upon the continued discharge of sand. Further, the raised portion 42 may be provided with openings for discharging the sand.

To provide different predetermined patterns of openings in the bottom 16, the scoop portions 12, 12' and the like are selectively removable and replaceable which may be accomplished by any convenient attachment means such as shown in the drawings. The rear portion of the scoop portion 12, 12' includes a box shaped socket member 44 with a top flange 46 joined to the rear wall 18. The handle portion 14 includes a box shaped socket member 48 on the front end that is insertable into the socket member 44 of the scoop portion 12. A lever 50 is joined to the body of the handle portion 14 in any convenient manner, such as by a so-called live hinge formed in the plastic, and has an upwardly facing plug 52 for engaging a similarly shaped hole 54 in the top flange portion 46 of the scoop portion 12 to lock the scoop portion 12 to the handle portion 14. A spring 56 resiliently urges the lever 50 upwardly for maintaining the engagement between the plug 52 and hole 54, as shown in FIGS. 3 and 5, or for allowing releasing of the connection with the hole 54 as shown in dashed lines in FIG. 4.

Referring now to FIGS. 9–14, a second embodiment of the present invention is illustrated wherein the scoop portion 12a and the handle portion 14a of the toy 10a are permanently connected, such as by the components thereof being integrally molded or affixed together by screws or the like. Again, the scoop portion 12a is provided with walls 18a on both sides and the rear but the bottom 16a is formed with a large open frame 60 and a template 62 that is removably mounted in the frame 60. Specifically, the bottom 16a is provided with a flange 64 encircling the open frame 60 for supporting the template 62 and a ridge 66 extending upwardly from the flange 64 to position and retain the template 62 on the flange 64. The template 62 is retained in position as a portion of the bottom 16a by any convenient means such as inserting the front edge 62' of the template 62 under retainer tabs 68 along the front of the open frame 60 and releasably securing the rear edge 62" of the template by a latch mechanism 70. As shown in FIGS. 10 and 11, the latch mechanism 70 may include a lever 72 pivotally mounted at 74 to rotate about a lateral axis. The lever 72 includes a locking tab 76 adapted to fit over and retain the template 62 in the open frame 60 when the lever 72 is in the forward position. The lever 72 may be rotated rearwardly against the resilient biasing of spring 78 by depressing the thumb button 80 until the locking tab 76 clears the template 62 to allow the template to be pivoted upwardly and released from the open frame 60. The lever 72 may also include a cam surface 82 that is engaged by the rear edge 62" of the template 62 upon installation of the template 62 in the open frame 60 to automatically cause the lever 72 to pivot rearwardly until the rear edge 62' clears the front of the locking tab 76 and becomes seated on the flange 64, whereupon the lever 72 is biased forwardly to lock the template 62 in place.

Figure 12:
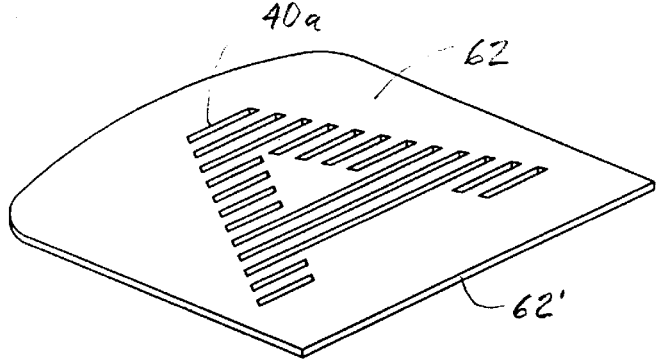
FIGS. 12, 13 and 14 are perspective views of modified embodiments of the template for use in the second embodiment of the toy of the present invention.
Figure 13:
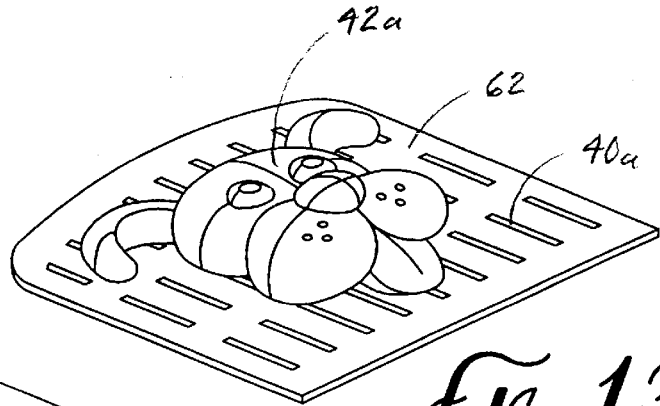
Figure 14:
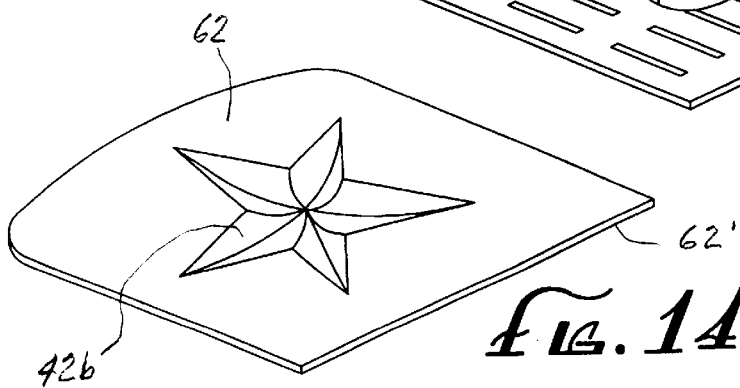

In this second embodiment, the handle portion 14a is provided with the same or a similar vibrating mechanism 22 (not shown) and switch 28 for selectively causing vibration of the toy 10a. The template 62 is provided with a predetermined pattern and size of openings 40a, such as the concentric heart pattern shown in FIG. 9, for discharging sand therethrough when the vibrating mechanism 22 is activated. As with the first embodiment the openings 40a are preferably of a size and shape to substantially retain the sand on the template 62 until the vibrating mechanism 22 is activated, whereupon the sand is uniformly discharged through the openings 40a. Alternate templates 62 are shown in FIGS. 12 and 13 wherein the openings 40a are provided in different patterns. FIG. 13 also illustrates a raised portion 42a of a three dimensional design that has the same or a similar function as the raised portion 42 illustrated in FIGS. 8A and 8B described above. FIG. 14 illustrates a template 62 having a mold 42b formed by a raised portion of the template which mold can be used to form a three dimensional pattern on the surface of the sand by pressing the bottom of the vibrating toy 10a and template 62 on the sand to force the sand upwardly into the mold and then removing the vibrating toy to reveal the three dimensional pattern. The template 62 of FIG. 14 may also be provided with openings (not shown).

Figure 15:
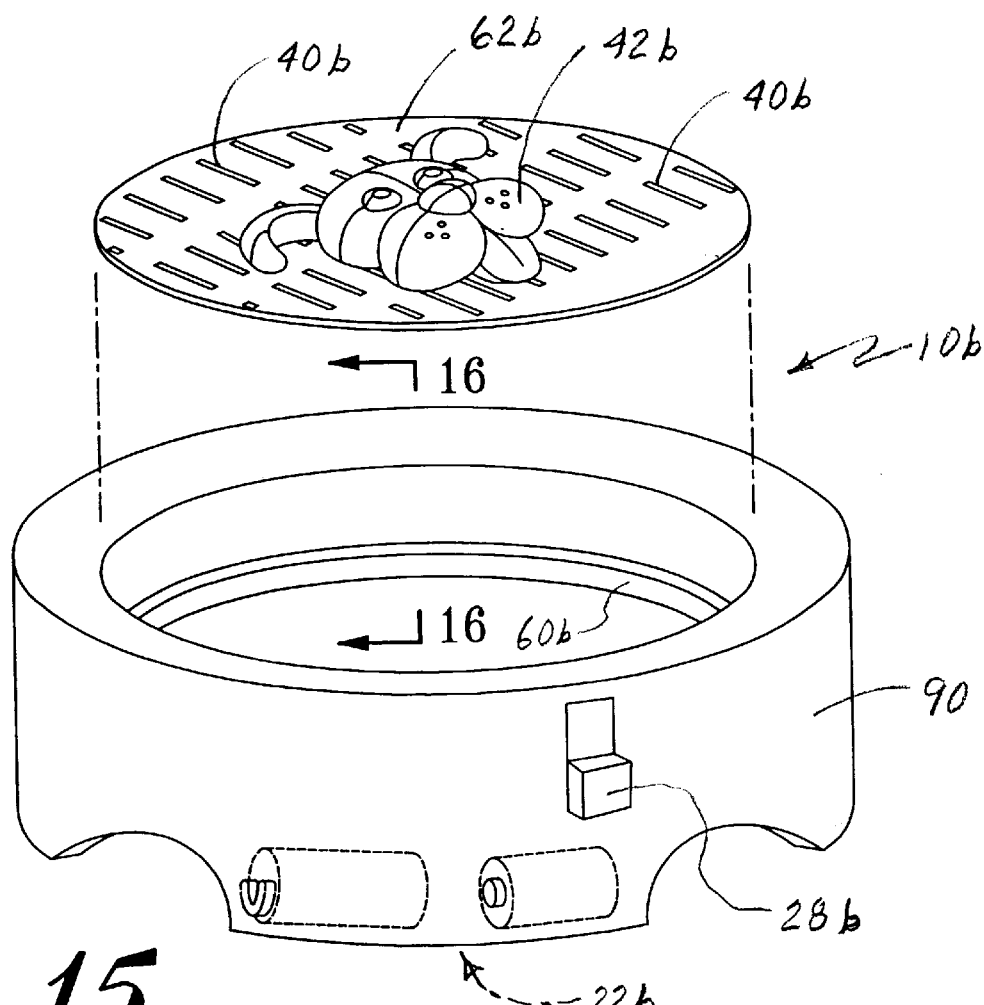
FIG. 15 is an exploded perspective view of a third embodiment of the present invention in the form of a movable hopper and illustrating a removable template similar to the second embodiment of FIGS. 9–14.
Figure 16:
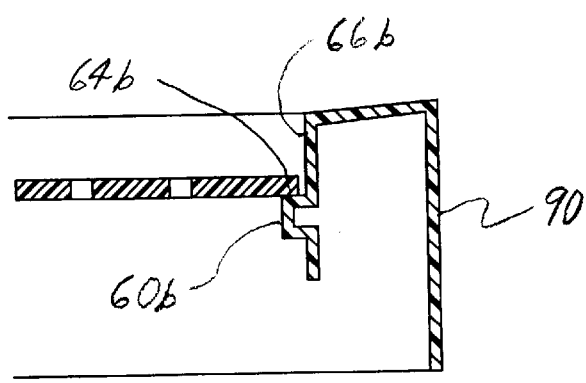
FIG. 16 is a partial sectional view of the third embodiment taken on the line 16—16 in FIG. 15.

Referring now to FIGS. 15 and 16, a third embodiment of the present invention is shown in the form of a movable hopper 10b adapted to be placed on any surface or in a sand box and through which the sand may be poured. Hopper 10b includes a bowl-like base 90 having a central open frame 60b with a flange 64b and a ridge 66b for receiving and supporting a removable template 62b, which elements are substantially the same as the frame 60, flange 64, ridge 66 and template 62, respectively, of the second embodiment. As with the second embodiment, the template 62b is removable and can be replaced by other templates having different predetermined patterns of openings 40b and/or raised portions 42b. In fact, if the frames 60 and 60b of the second and third embodiments are constructed of the same size and shape, the templates 62 and 62b may be used interchangeably. The base 90 of hopper 10b is provided with a vibrating mechanism 22b and a switch 28b for selectively activating the vibrating mechanism, similar to the first and second embodiments.

In addition to the first, second and third embodiments described above and the variety of patterns of openings 40, 40a and 40b and raised portions 42, 42a and 42b that may be used with this invention, various other changes and modifications may be made without departing from the spirit and scope of the present invention and such changes and modifications are within the purview of the following claims.

What is claimed is:

1. A toy for children to use with sand, comprising, a handle portion and a scoop portion, said handle portion defining a housing, a battery powered vibrator mounted in said housing for effecting selective vibration of said scoop portion, a switch in said handle portion for selectively activating said vibrator, said scoop portion having walls for retaining the sand and a bottom extending between said walls, said bottom including an open frame and a template, said template being removably and replaceably mounted in said open frame and having openings of a predetermined pattern and size for the discharge of sand therethrough upon activation of said vibrator, said open frame including a support flange and a ridge for supporting said template in a fixed position, and including a latch mechanism for releasably retaining said template in said open frame.

2. A toy for children to use with sand, comprising, a handle portion and a scoop portion, said handle portion defining a housing, a battery powered vibrator mounted in said housing for effecting selective vibration of said scoop portion, a switch in said handle portion for selectively activating said vibrator, said scoop portion having walls for retaining the sand and a bottom extending between said walls, said bottom including an open frame and a template, said template being removably and replaceably mounted in said open frame and having openings of a predetermined pattern and size for the discharge of sand therethrough upon activation of said vibrator, and a latch mechanism for releasably retaining said template in said open frame.

3. The toy of claim 2 wherein said latch mechanism is adjacent said handle portion, and retainer tabs are provided on a front portion of said bottom of said scoop portion for retaining said template.

4. A toy for children to use with sand, comprising, a handle portion and a scoop portion, said handle portion defining a housing, a battery powered vibrator mounted in said housing for effecting selective vibration of said scoop portion, a switch in said handle portion for selectively activating said vibrator, said scoop portion having walls for retaining the sand and a bottom extending between said walls and said bottom of said scoop portion including an open frame, and a plurality of templates individually removably and replaceably mounted in said open frame, said templates having openings therein of different predetermined patterns for the discharge of sand therethrough upon activation of said vibrator.

5. The toy of claim 4 including a latch mechanism for releasably retaining one of said templates in said open frame.

* * * * *